Nov. 17, 1936.  A. A. FRIESTEDT  2,060,804
STEERING CONTROLLER
Filed May 15, 1933  4 Sheets-Sheet 1
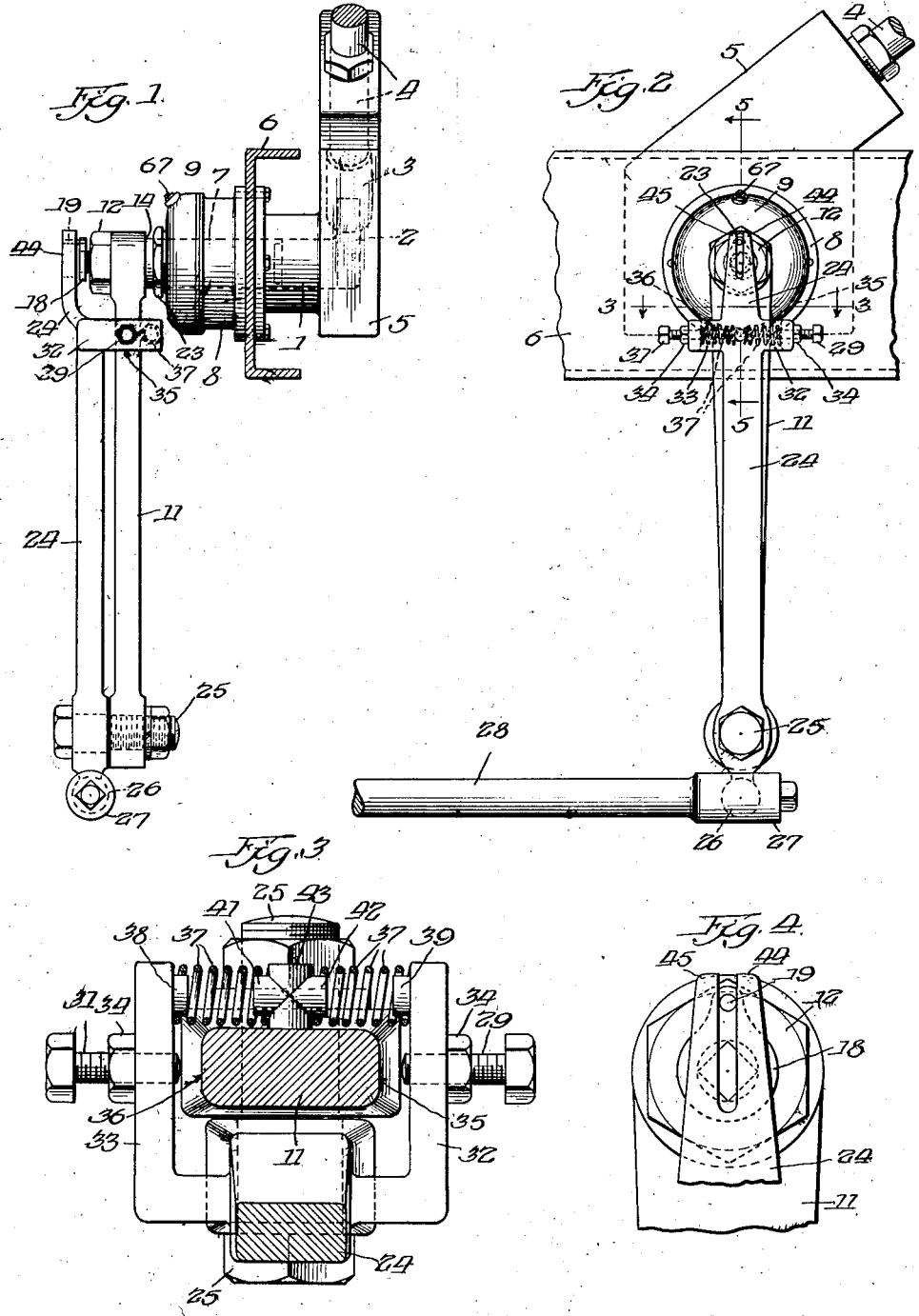

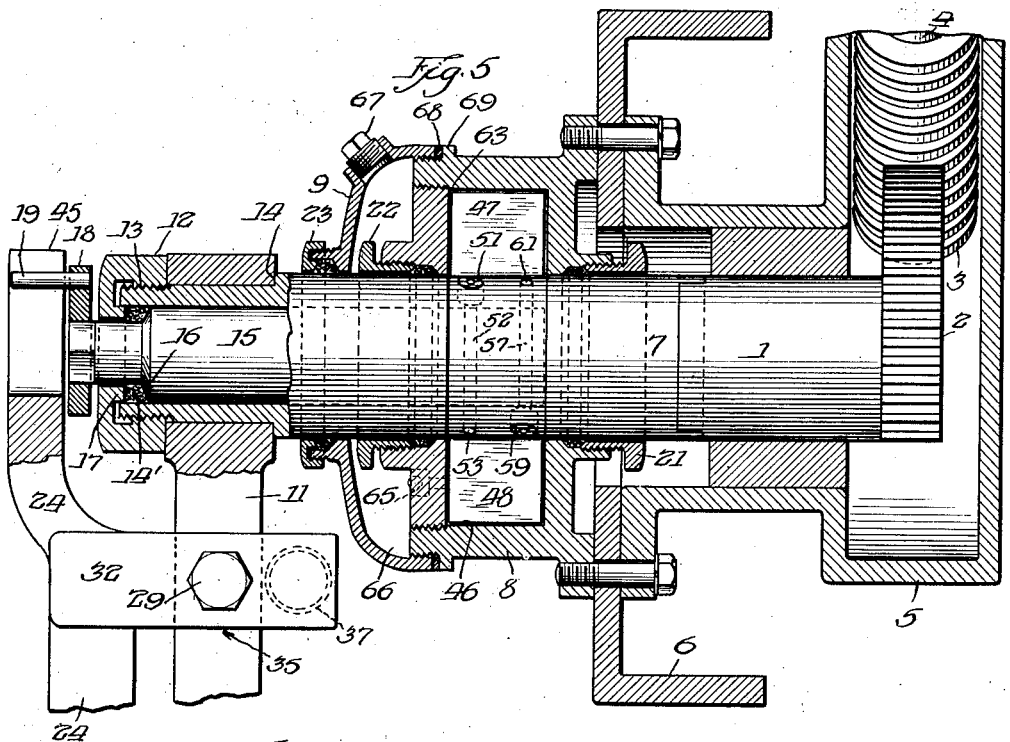
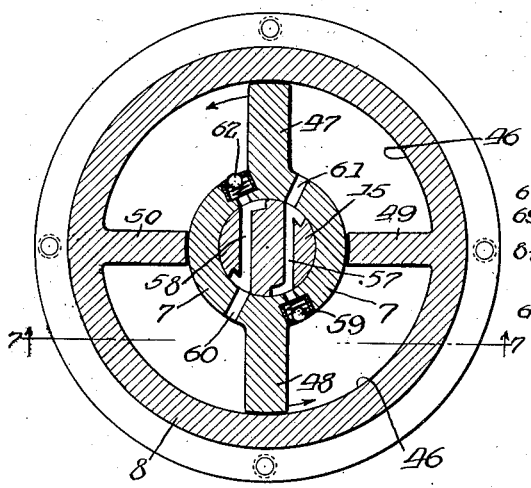
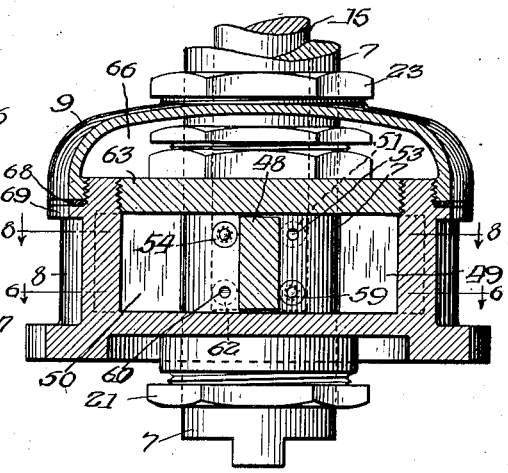

Nov. 17, 1936.  A. A. FRIESTEDT  2,060,804
STEERING CONTROLLER
Filed May 15, 1933   4 Sheets-Sheet 3
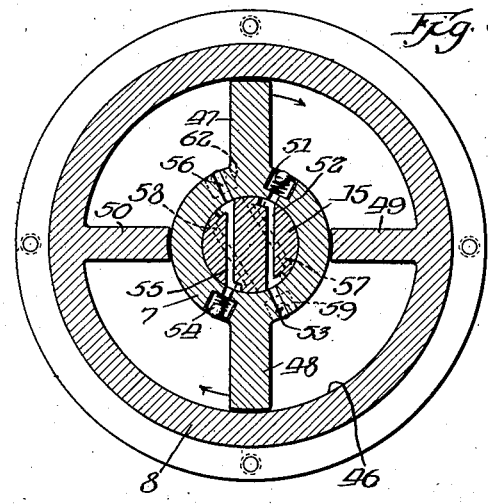
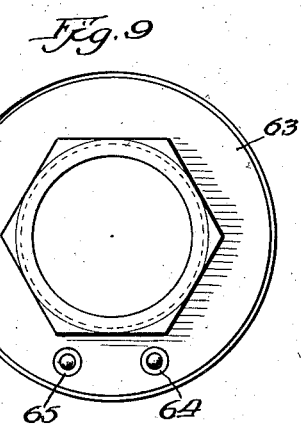
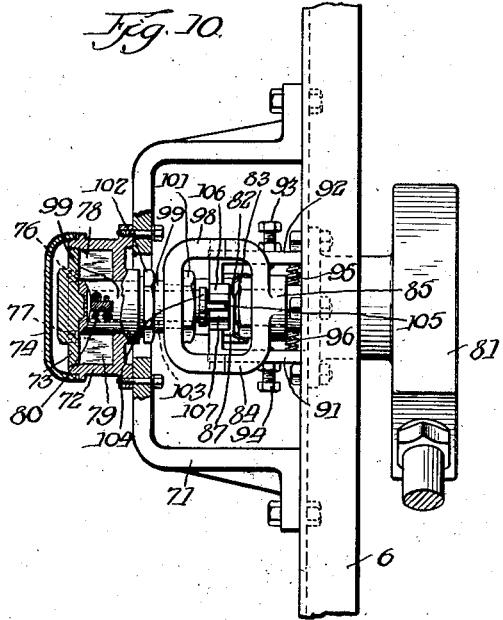
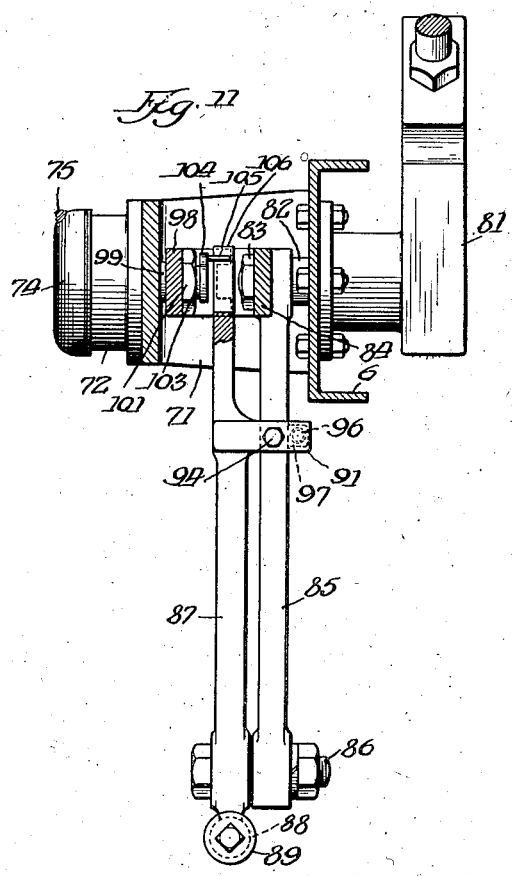
Inventor:
Arthur A. Friestedt
By Ira J. Wilson
Atty

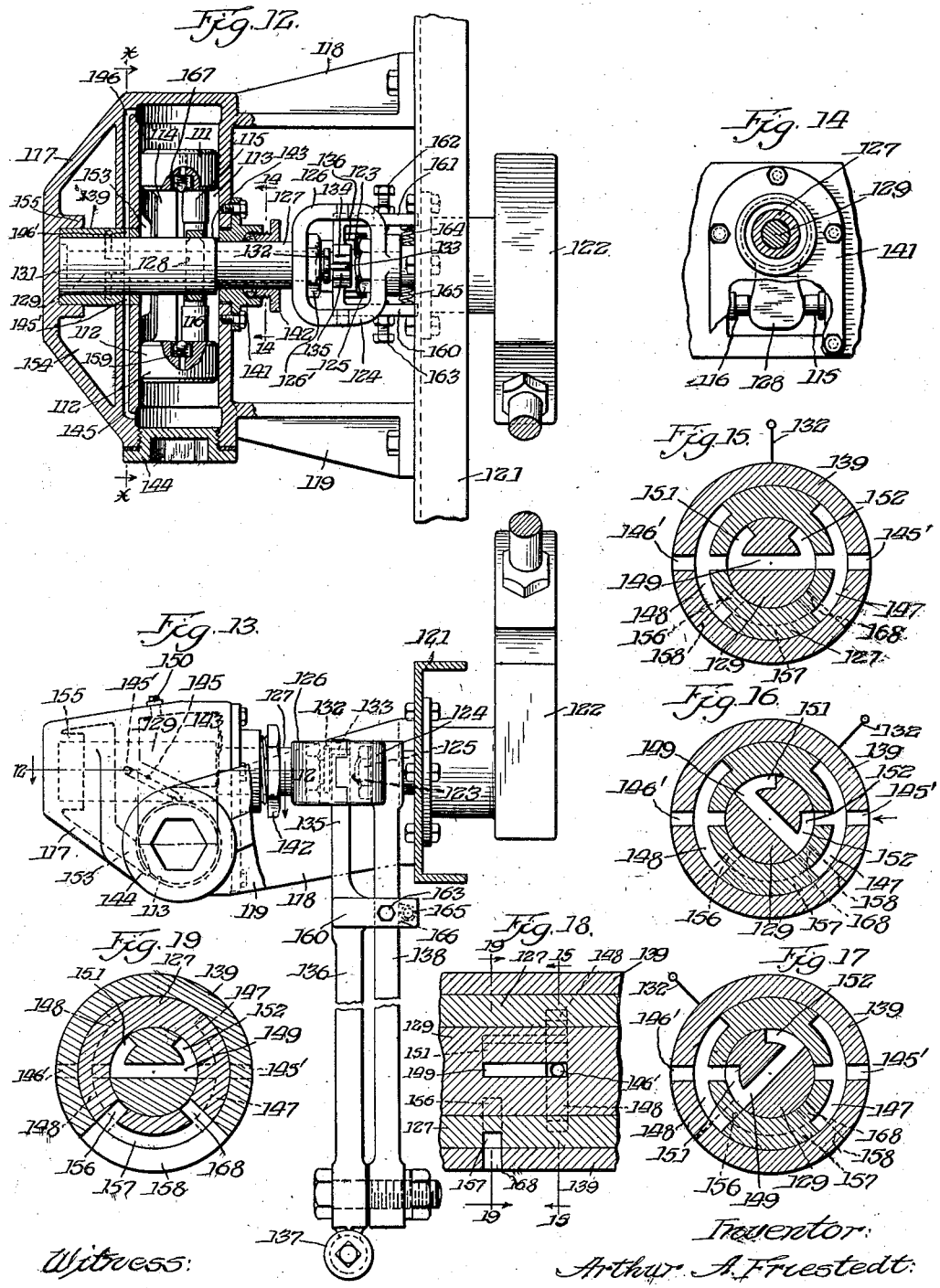

Patented Nov. 17, 1936

2,060,804

UNITED STATES PATENT OFFICE 2,060,804

STEERING CONTROLLER

Arthur A. Friestedt, McHenry, Ill.

Application May 15, 1933, Serial No. 671,153

13 Claims. (Cl. 280—90)

This invention pertains to improvements in steering mechanism for vehicles and relates particularly to improvements in the control of steering.

Steering mechanisms for vehicles such as automobiles, trucks and buses usually are so constructed that while the front wheels ordinarily are readily steered and are under control of the steering wheel, road thrusts of various kinds also are able to turn the front wheels and in some cases they often deflect them so sharply as to wrench the control of the car from the driver. Newspapers frequently report fatal accidents resulting from blown-out front tires and from front wheels striking holes in pavements, causing the cars to swerve sharply to collide with other vehicles or to plunge off the roadways. This invention aims to provide apparatus enabling the driver to maintain control over the steering regardless of the sudden occurrence of unusual thrusts from the roadway upon the wheels.

Other objects of the invention include providing apparatus to make normal steering problems easier, yet employing apparatus which is simply constructed and unlikely to get out of order, and which is so inexpensive as to be available to all drivers of vehicles and generally to facilitate accurate steering of automobiles under all road conditions.

The present specification discloses the invention in several actual embodiments, thus indicating that the principles of the invention may be utilized in various structures some of which are herein disclosed and others of which may be devised.

Fig. 1 of the drawings is a rear elevation showing one form of a "vane type" of the device applied to the steering mechanism of a vehicle, Fig. 2 is a side elevation of the same embodiment, Fig. 3 is a sectional view on the line 3—3 of Fig. 2, Fig. 4 is an end view of the valve of Fig. 1, viewed from left side of Fig. 1, Fig. 5 is a vertical central section on the line 5—5 of Fig. 2, Fig. 6 is a sectional view on the line 6—6 of Fig. 7, Fig. 7 is a sectional view on the line 7—7 of Fig. 6, Fig. 8 is a sectional view on the line 8—8 of Fig. 7, Fig. 9 is an end elevation of the plate shown in Fig. 7, Fig. 10 is a top plan view partially in section of another form of the "vane type" of the invention, Fig. 11 is a rear elevation of the same form of the invention as Fig. 10 discloses, partly in section, Fig. 12 is in part a horizontal section on line 12—12 of Fig. 13 and in part a top plan view of one form of a piston type modification of the invention, Fig. 13 is a rear elevation of the device shown in Fig. 12, Fig. 14 is an elevation at the position of the line 14—14 of Fig. 12 showing a detail of the device, Fig. 15 is a partial vertical section on line 15—15 of Fig. 18, showing the valve arrangement of the device of Fig. 12 in neutral position, Fig. 16 is a view of another position of the same valve assembly of Fig. 12, Fig. 17 is a view of another position of the valve assembly of the device of Fig. 12. The plane passing through line 15—15 of Fig. 18 also passes through line x—x of Fig. 12.

Fig. 18 is an enlarged partial central vertical sectional view through the valve passages of Fig. 12, and Fig. 19 is a partial vertical section on line 19—19 of Fig. 18.

Referring now to Figs. 1 to 9, inclusive, the invention in one of its preferred embodiments is disclosed as being attached to the steering sector shaft 1, the latter being rotated by means of the steering sector 2, which is in mesh with the worm gear 3 on the steering shaft 4.

The sector gear housing 5 is mounted on the chassis frame 6 and the sector shaft engages, by means of a mortise joint, another shaft 7 which passes through the car frame and through a housing 8 likewise bolted or otherwise suitably secured to the chassis frame.

As shown best in Fig. 5, the shaft 7 protrudes through a housing cap 9 and at its outer extremity has splined thereon a steering arm 11 which is preferably a little shorter than the steering arm employed on present day automotive vehicles. A combination locking and packing gland nut 12 screwed onto the threads 13 of the shaft 7 serves to hold the steering arm 11 on the shaft snugly up against the shoulder 14, and holds suitable packing 14' against the inside of the shaft and against the inclined shoulder of the valve 15.

The valve 15, rotatable within the hollow shaft 7 is provided with a shoulder 16 against which the inner flange 17 of the nut may force the packing. Thus this valve will be retained against longitudinal movement and oil leakage at that location is prevented. For convenience it may be considered that the shaft 7 is a continuation of the shaft 1. The outer end of the valve 15 is provided with a squared reduced portion upon which may be secured, by a driving fit, a short lever 18 which carries in its upper end a pin 19.

A packing gland nut 21 will serve to prevent oil leakage along the sector shaft from the interior of the housing 8, while another packing gland nut 22 serves a similar purpose at its location. A third packing gland nut 23 likewise performs the function of preventing oil leakage.

As shown in Fig. 1 there is mounted parallel to the depending steering arm 11 a control arm 24 which is mounted rotatably on a pin 25 threaded into and locked on the arm 11. The lower end of the control arm 24 carries a ball 26 which will be engaged with the socket 27, of the usual construction that is found on the rear end of the drag link 28. It will be understood that the drag link is connected with the steering knuckle and tie rod assembly such as are usually found on present day automobiles. Having this in mind it will be understood that rearward motion of the drag link will deflect the front wheels to cause a car to turn toward the right, while forward motion of the drag link steers the car to the left.

The steering control arm is free to oscillate about the pin 25 only a limited amount, the limitation being established by means of stop screws 29 and 31 which pass through the ears 32 and 33 formed integrally on the control arm. These stop screws will ordinarily be locked by means of nuts 34, their inner ends being adjusted to abut the sides of the steering arm at the points indicated by the numerals 35 and 36. In order to cushion the oscillation of the control arm relatively to the steering arm and to tend to restore them to parallel relationship, there are provided compression springs 37 anchored on the spring pilots 38 and 39 carried by the ears and also upon the pilots 41 and 42 carried by a lug 43 formed integrally on the side of the steering arm 11.

The upper end of the control arm is bifurcated to provide the fingers 44 and 45 on opposite sides of the pin 19. Hence the oscillation of the control arm relatively to the center of the valve 15 will cause the lever 18 to be oscillated to one side or the other.

Within the housing 8 (see Fig. 8) is a chamber 46 through which the sector shaft 7 passes carrying fixed thereon a pair of opposite vanes 47 and 48. Two stationary vanes, or partitions, 49 and 50 divide this chamber in half. As the clearances about the margins of the movable vanes are very small, rotation of the movable vanes in either direction toward the stationary vanes will be resisted by the incompressibility of the oil or other suitable liquid which the chamber is intended normally to contain.

Fig. 8 shows the valve 15 set to permit the vanes 47 and 48 to rotate only clockwise, as will be the case when the driver of the vehicle is turning the steering wheel to produce left steering, for at this time the lower end of the steering arm 11 is swinging forwardly toward the front of the car, or clockwise, viewing Fig. 2. The thrust then exerted upon the ball 26 by the movement of the steering arm will cause the upper end of the control arm to swing forwardly and will have thereby rotated the valve 15 counterclockwise into the position which it occupies in Fig. 8. Thereafter so long as the thrust remains the same the alignment of the two arms remains the same and the valve 15 rotates in unison with the clockwise rotation of the vanes. Compression of the oil, normally contained in the chamber 46, will cause the ball in the check valve 51 to depress and permit the flow of oil past it through the valve passage 52 and shaft passage 53 into the opposite side of the chamber behind the advancing vane 48. Likewise the increasing pressure in advance of the vane 48 will force oil through the check valve 54, valve passage 55 and shaft passage 56 into the space behind the vane 47. The size of these apertures and passages is intended to be ample to permit the vanes to move freely at this time in a clockwise direction so that the driver will not experience any resistance to the steering caused by this mechanism. However, it is clear that the vanes cannot at this time reverse their rotation as such action will be immediately opposed by the check valves 51 and 54.

The total angular rotation of the steering arms in present day steering mechanisms for automobiles is usually less than 90°, hence the vanes 47 and 48 will ordinarily not be called upon to rotate more than 45° from the center position shown in Fig. 8. Bearing this in mind it will be perceived that the stationary separating partitions 49 and 50 should ordinarily be mounted horizontally when the housing 8 is positioned on the chassis.

Should the driver of the car, while the valve and sector shaft occupy the relative positions shown in Fig. 8, desire to steer his car to the right he will thereupon reverse his wheel and hence the thrust on the ball 26, thereby causing the top of the control arm to swing rearwardly rotating the valve itself in a clockwise direction. A full swing to the rear of the upper end of the control arm until the stop screw 31 bumps against the steering arm 11 will place the valve channels 57 and 58 in position to register with passages in the sector shaft which are nearest the sector gear itself. (See Fig. 6.) Thus the valve channel 57 will register with a check valve 59 and the opposite shaft passage 61 while the valve channel 58 will register with a check valve 62 and sector passage 60. The valve passages 52 and 55 (best shown in Fig. 8) will at this time be completely sealed off from their associated passages and check valves in the sector shaft.

During right hand steering of the car, the vanes 47 and 48 will move counterclockwise and the check valves 62 and 59 are set to admit the oil to flow only out of the spaces that are under compression, due to the advance of these blades, the principle being the same as governs the operation of the check valves 51 and 54. While the valve passages 57 and 58 are in alignment with their associated check valves only counterclockwise rotation of the vanes is permitted.

Should the steering arm and control arm move into parallel alignment due to the nonexistence of thrust on the ball 26, the valve 15 will move into a position where all of the valve passages are in registration with their associated check valves and associated sector outlets. This is easily arranged by having the offset recesses on the valve passages provided as shown in Figs. 6 and 8. Thus in the neutral position of the valve motion of the vanes in both directions will be unchecked and the steering arm 11 will thereupon be free to swing rearwardly or forwardly.

The chamber 46 is covered by a plate 63 which closes the chamber so that no oil may escape between that plate and adjacent surfaces of the movable vanes. In order to keep an adequate supply of oil in the chamber 46, check valves 64 and 65 are provided which will admit oil into the chamber whenever the pressure therein is less than the pressure in the cap chamber 66. A plug 67 may be employed to close a filling opening through which oil may be supplied from time to time to replace any lost by reason of leakage. The cap 9 is screwed tightly against the packing ring 68 abutting the annular shoulder 69, to prevent oil leakage.

A modification of the vane type of the invention, consisting merely in a different manner of mounting it, is shown in Figs. 10 and 11. The car frame 6 instead of having the cylinder 8 mounted directly upon it, carries the cylinder mounted on a bracket 71, the cylinder itself also being in this case somewhat modified since it is pierced at only one end. The cylinder 72 is provided with a closure plate 73 and a cap 74. A filling opening and plug 75 is also provided, and check valves 76 and 77 are provided in the closure plate corresponding in position and function to the check valves 64 and 65.

Stationary partitions 78 and 79 correspond to the stationary partitions 49 and 50 of Fig. 6, while a pair of snugly fitting movable vanes, which in neutral position are at right angles to the partitions, are carried upon the shaft 99 which rotates in the housing 72. The top end of one of these vanes 80 appears in Fig. 10.

A gear housing 81 encloses the steering shaft worm and a sector gear meshed therewith. A sector shaft 82 integral with the sector gear extends from the gear housing through the chassis frame, and splined upon this sector shaft and held by a nut 83 is a half yoke 84 integral with a steering arm 85. The steering arm carries a pin 86, on which pivots a control arm 87, the latter carrying a ball 88 for connection to a drag link socket 89. The control arm is provided with a pair of ears 91 and 92 which carry stop screws 93 and 94 for limiting the oscillation of the control arm relatively to the steering arm 85, the stop screws bumping against the sides of the latter arm. Centering springs 95 and 96 are also carried by these ears and their inner ends are stopped against a lug 97 carried on the side of the steering arm.

Another half yoke 98 is arranged to have a mortise and tenon connection with the half yoke 84 so that the two may rotate in unison as one yoke. The yoke 98 is splined upon a shaft 99 which carries the movable vanes in the housing 72. A suitable locking nut 101 will retain this latter yoke in position. A packing gland 102 of common construction will serve to prevent oil leakage from the chamber 72. It will be thus understood that the shaft 99 moves in unison with the sector shaft 82, being in function a continuation of the same though not so in actual construction.

Carried within the hollow shaft 99 is a valve 103 having a squared end on which is fixed an integral lever 104 carrying a pin 105 which extends between bifurcated fingers 106 and 107 at the top of the control arm 87. The arrangement of passages in the valve 103, the passages in the shaft 99 and the check valves carried by the latter shaft will be the same as are illustrated in Fig. 6 and Fig. 8. The relative arrangement of these passages and check valves employed in the modification shown in Fig. 10 would appear as they do in Fig. 8, if viewed from the left side of Fig. 10, when the valve is set to permit left steering only. When set for right steering the valve setting would look like Fig. 6.

The mortise and tenon connection of the two half yokes 84 and 98 readily permit the removal of that portion of the control mechanism which is carried by the bracket 71. Such removal may be needed for repairing or replacing parts, and after such removal the stop screws 93 and 94 may be screwed in tightly so that the mechanism may for a time function as does the old style steering apparatus.

In many of the present steering mechanisms for automobiles, when a car is being steered around a sharp curve, for example, as at street intersections, the wheels have a strong tendency to straighten out, that is, to align themselves parallel to the chassis. This requires the driver to maintain a strong pull on the wheel constantly to overcome that tendency. But when this invention is employed the thrust exerted by the drag link in opposition to the pull on the wheel by the driver will cause the control arm to swing the valve over in a direction which will enable the movable vanes, acting against the oil in the casing, to check and oppose this straightening out tendency. Once the valve is thus rotated the driver will need only to keep enough pressure on the wheel to hold the compression on whichever centering spring happens to be compressed. To let the wheels straighten themselves out when the turn is completed the driver needs only to release the wheel and the centering springs will align the control arm and steering arm and keep them aligned while the wheels straighten out. The steering wheel will be free to spin as usual.

By substituting stronger or weaker centering springs, or varying the tension on any set in use, the operator can make the control arm more or less subject to the thrusts imparted to it. Though stiff springs should be employed so that ordinary road thrusts, or ordinary pulls on the steering wheel, will not disturb parallel alignment of the control and steering arms enough to swing the valve from neutral to either checking position, yet the springs will not be made so stiff as to prevent checking operation of the valve whenever a thrust of an emergency nature arises, such as may be caused by a bad pavement, a blown-out front tire or an equivalent thrust created from the steering wheel itself.

A further modified form of the invention is illustrated in Figs. 12 to 19, inclusive. Instead of using vanes rotating in a cylinder, this form of the invention employs a pair of pistons 111 and 112 which slide in the cylinder 113. These pistons are connected rigidly together by means of a web 114 and are provided with bosses 115 and 116. The cylinder 113 is formed in a housing 117 which is carried by brackets 118 and 119 on a car frame 121. A steering gear housing 122 likewise is carried on the car frame to house the steering worm and steering sector gear (not shown). The sector shaft 123, integral with the sector gear on its end, carries splined thereto a half yoke 124 locked thereon by a nut 125 and connected for simultaneous movement with another half yoke 126. This connection likewise may be established simply by a mortise and tenon joint. The half yoke 126 is splined on a shaft 127 outside of the housing or casing 17. This yoke is held on the shaft by a combination lock and packing gland nut 126' which is similar to nut 12 in Fig. 5. Inside of the housing on the shaft 127 there is fixed a depending lever 128 which abuts the bosses 115 and 116 to cause the pistons to move in one direction or the other, depending upon the rotation of the shaft 127. This shaft also is hollow and carries therein a valve 129 which is held against longitudinal motion by means of an enlargement 131 fitting in a corresponding recess in the shaft. The outer end of the valve is squared and fixed thereon is a lever 132 in which is mounted a pin 133. The latter extends between bifurcated fingers 134 and 135 mounted at the top of the control arm 136. The arm 136 carries the ball 137 for connection to a drag link socket, while the steering arm 138 is formed preferably integrally with the half yoke 124 which is splined upon the end of the sector shaft 123.

The half yokes 124 and 126 transmit the motion of the sector shaft effectively and simplify the task of removing the control mechanism from service for the making of repairs or replacements.

In order that the shaft 127 may be inserted conveniently into the housing 117 and into its bearing 139, the housing is provided with an aperture, covered by a plate 141, large enough to admit the shaft and the lever 128 which depends therefrom. A packing gland 142 will then serve to prevent oil leakage. The shaft 127 is held against longitudinal movement by reason of the shoulder 143 which abuts the inner margin of the plate 141. The pistons may be inserted into the housing by removing a plug 144.

The upper portion of one end of the cylinder 113 is connected by a passage 145 with the outer surface of the shaft 127 while the upper portion of the opposite end of the cylinder is connected to the same shaft surface by the passage 146. By leading these passages out of the upper portion of the cylinder ends, any air or gas in the cylinder will be thus expelled and cannot be trapped to interfere with the intended operations.

The valve arrangement is best shown in the diagrammatic Figs. 15 to 19, inclusive. The bearing 139 has passages 146' and 145' for registration with the respective passages 146 and 145. The shaft is provided with an arcuate recess 147 and an opposite arcuate recess 148. Fig. 15 shows the valve in the neutral position with relation to the shaft. The valve itself has a transverse passage 149 and marginal recesses 151 and 152. In the neutral position shown in Fig. 15, oil is free to flow without obstruction from one end of the cylinder to the other through the shaft and valve. The middle portion of the cylinder is also in communication through an aperture 153 with the oil reservoir 154 which surrounds the boss 155, which supports the shaft bearing.

A plug 150 closes a filling opening in the highest portion of the casing through which oil, or other desired liquid may be introduced to keep the casing nearly full at all times. A small amount of air may be left in the top to take care of expansion due to temperature increase.

When the driver steers to the left, the counterclockwise rotation of the steering wheel exerts a thrust which will cause the top of the control arm 136 to swing forwardly, the bifurcated fingers on the control arm will rotate the valve 129 into the position in Fig. 17, establishing communication between the forward end of the cylinder and its passage 146, through the port 146', shaft recess 148, valve recess 151, and thence through the shaft passage 156, shaft recess 157, bearing recess 158 and down into the oil reservoir. Thus the piston 111 can move forwardly as the steering arm and sector shaft are rotated in a clockwise direction (viewed from the left side of the car) and the oil displaced at the forward end of the cylinder will merely flow into the oil reservoir. A check valve 159 in the piston 112 will be opened because of a lowered pressure at the rear end of the cylinder, this end of the cylinder being otherwise sealed by reason of the fact that the passage 145 and port 145' are sealed off by the rotation of the valve. The opening of the check valve 159 of course admits oil to the rear end cylinder and prevents a partial vacuum from being formed. With the valve in the position of Fig. 17 the pistons cannot reverse their movement because the check valve 159 would then close and prevent it. Hence the yoke connected to the shaft 127 will hold the steering arm 138 locked against rearward swinging, that is, right steering.

In this modified form the control arm is provided with ears 159 and 161 carrying stop screws 162 and 163 whose limiting functions should by this time be well understood. Centering springs 164 and 165 are also carried by these ears to stop against a lug 166 carried on the side of the steering arm.

During steering to the right, the valve takes the position shown in Fig. 16 relatively to the shaft. Of course the shaft itself may be rotated out of the neutral position shown in Fig. 16, but the valve will of course occupy the same relation thereto. In the case of right steering, the pistons move rearwardly. The check valve 159 closes, but check valve 167 in the forward piston opens. Oil is forced through passage 145, port 145' in the bearing, shaft recess 147, valve recess 152, shaft passage 168, shaft recess 157, bearing recess 158, thence into the oil reservoir. The valve then holds cylinder passage 146 sealed, and the pistons cannot reverse their movement so long as the valve remains unchanged. A hard road thrust rearwardly on the drag link at this time would of course kick over the valve and stop further deflecting of the wheels to the right.

The same principles will govern the use of strong or weak centering springs for keeping the control arm and the steering arm in alignment and permitting dis-alignment as was discussed above in connection with the form of the invention which employs movable vanes instead of reciprocating pistons. In this modification the pistons and associated valve mechanism will enable the driver to control the steering in spite of violent shocks and thrusts. By varying the centering springs the control may be made more or less responsive to light thrusts.

For convenience, oil is repeatedly referred to as the liquid which resists the movement of the vanes or pistons. However, the use of other liquids of a non-freezing character is contemplated and embraced by this invention.

The present disclosure is intended to portray the invention only in a few selected embodiments. Other modifications will suggest themselves and may be employed without, however, departing from the spirit and scope of the invention, especially as it is defined in the appended claims.

Having shown and described the invention, I claim:

1. In a vehicle steering apparatus, a drag link for turning dirigibly mounted steering wheels, a manually rotatable shaft and a swinging arm fixed thereon, a lever pivoted to said arm and to said link at longitudinally separated points, a cylindrical chamber concentric with said shaft having a close fitting concentric piston therein moving in a body of liquid, said arm and piston being connected for simultaneous movement, and valve means connected with said lever actuated by pivotal movement of said lever on said arm for regulating liquid flow in the chamber to control motion of said piston.

2. In a vehicle steering apparatus, a manually rotatable shaft, a cylindrical chamber concentric with said shaft containing a liquid and having a piston movable therein, an oscillatable steering arm fixed on said shaft, said shaft being arranged to propel the piston in two opposing directions, and a valve carried in said shaft concentric therewith for regulating the flow of said liquid for controlling the movement of said piston.

3. In combination with a vehicle having dirigibly mounted wheels, means for deflecting said wheels, a drag link connected to said means, a steering shaft and a steering arm fixed thereon, a lever pivotally carried by said arm and connected longitudinally apart from said pivot point to said drag link, means for limiting the pivotal movement of the lever relatively to said arm, a cylindrical chamber concentric with said shaft containing a liquid and a piston movable therein, the chamber being mounted stationarily on the vehicle, the piston being connected for movement only in unison with said arm, means including a valve for controlling the flow of liquid propelled by said piston, and means controlled by relative movement of said lever and arm for regulating said valve to stop the liquid flow and thereby stop the piston movement.

4. In combination with a vehicle having running wheels dirigibly mounted for steering, a steering wheel and a sector shaft rotatable thereby, means connecting said shaft to said running wheels for steering them, a cylindrical chamber concentric with said shaft containing a liquid and a piston therein, the latter being connected to said shaft to be propelled thereby, and means responsive to variations in the operative thrusts exerted by or upon said sector shaft for regulating the flow of liquid propelled by the piston.

5. In a vehicle steering mechanism, a drag link for connection to the running wheels, a steering arm, means for rotating said arm, a cylinder containing a movable vane and a stationary vane, said chamber and vanes being operatively connected with said arm whereby one of said vanes moves in unison therewith while the other remains stationary, means for regulating a flow of liquid propelled by relative movement of the vanes, and means operatively connecting said arm and said link arranged to permit limited relative movement between them and also arranged to operate said liquid regulating means in accordance with said relative movements.

6. In a steering control mechanism, a drag link for connection to dirigibly mounted running wheels, a shaft having an oscillatable steering arm mounted thereon, a lever pivotally connected to said arm and said link at longitudinally separated points, an enclosed cylindrical chamber concentric with said shaft provided with a stationary vane, a movable vane rotatable in said chamber relatively to said stationary vane and connected with said arm to rotate in unison therewith, means for rotating said arm, means for regulating liquid flow in said chamber caused by movement of the movable vane, and means operatively connecting said lever and said regulating means for controlling the liquid flow in said chamber in accordance with certain relative movements of the link and the steering arm.

7. In a vehicle steering apparatus, a drag link for connection to dirigibly mounted running wheels, a steering wheel and a sector shaft provided with intermeshed gears, a steering arm carried by said shaft, a liquid filled cylindrical chamber concentric with said shaft having a stationary vane therein and a movable vane connected for rotation in the chamber in unison with the rotation of said shaft, a valve for regulating the flow of said liquid caused by relative movements of the two vanes, and means connecting said link and said arm arranged to allow limited relative movement of them and effective upon such relative movement to control said valve.

8. In a steering control mechanism, a drag link for connection to a pair of dirigibly mounted running wheels, a hollow shaft and a steering arm carried thereby, means for rotating said shaft for steering purposes, a cylinder about said shaft provided with two stationary vanes and two movable vanes, the latter being integral with said shaft, a valve and passages provided in said hollow shaft for regulating the flow of liquid propelled by the movable vanes, and means connecting said arm and link arranged to permit limited but substantially relative movement therebetween and constructed to operate said valve.

9. In a steering control mechanism, a steering shaft and an arm fixed thereon and manually controlled means for rotating the same about a stationary axis, a drag link for connection to dirigibly mounted running wheels for steering them, a liquid containing chamber and a pair of reciprocable pistons therein, a lever connected to rotate with said shaft for reciprocating said pistons, a valve for controlling and regulatably opposing liquid flow in the chamber caused by movement of the pistons, and means connecting the drag link and steering arm arranged to allow limited but substantial relative movement therebetween and further constructed to control the action of said valve.

10. In a steering control mechanism, a steering arm and manually controlled means for rotating the same, a drag link for connection to dirigibly mounted running wheels for steering them, a liquid containing chamber and a pair of reciprocable pistons therein, means connected rigidly with said steering arm and rotatable concentrically therewith for reciprocating said pistons in unison therewith, a valve for controlling the flow of said liquid responsive to piston movements arranged in one position to oppose piston movement in one direction, in another position to oppose piston movement in the opposite direction, and in a neutral position to oppose piston movement in neither direction, and means connecting the drag link and steering arm arranged to allow limited but substantially relative movement therebetween and further constructed to control the action of said valve.

11. In a steering control mechanism, a steering arm and manually controlled means for rotating the same, a drag link for connection to dirigibly mounted running wheels for steering them, a liquid containing chamber and a pair of reciprocable pistons therein, means connected rigidly with said steering arm and rotatable concentrically therewith for reciprocating said pistons in unison therewith, a valve for controlling the flow of said liquid responsive to piston movements arranged in one position to oppose piston movement in one direction, in another position to oppose piston movement in the opposite direction, and in a neutral position to oppose piston movement in neither direction, and a lever pivotally connected to said link and arm at separated points oscillatable by relative thrusts of the arm and link thereupon and thus arranged to move the valve to either of its opposing positions.

12. In a steering control mechanism, an oscillatable hollow shaft and a steering arm rigid thereon, means for rotating said shaft, a drag link for connection to dirigibly mounted running wheels, a liquid containing chamber and a pair of pistons reciprocable therein, means rigidly connected with said shaft for causing said pistons and shaft to move always in unison, said shaft having passages therethrough, the chamber walls having ducts leading from opposite ends of the chamber for connection to said passages, a valve rotatable with said shaft having channels for registration with said passages, check valves associated with said pistons, valve and shaft all co-operating to enable various positions of the first valve to oppose or permit movement of the pistons in either direction, and means connecting said link and arm for controlling said positions of said valve.

13. In a steering control mechanism, a rotatable shaft and steering means for manually rotating the same, a steering arm fixed on said shaft, a lever pivotally connected to the lower end of said arm, a drag link for steering the dirigible running wheels of a vehicle connected with said lever at a point spaced apart from said pivotal connection, a chamber having a pair of pistons therein operatively connected with said shaft to be moved thereby as the shaft rotates, a valve mechanism rotatable on an axis concentric with the axis of said shaft, fluid ducts being provided in the valve and piston assembly for controlling fluid flow responsive to piston movement, said valve being oscillated to regulate said ducts by pivotal movement of the upper end of said lever relatively to said arm.

ARTHUR A. FRIESTEDT.